US012540686B2

(12) United States Patent
Vande Sande

(10) Patent No.: US 12,540,686 B2
(45) Date of Patent: Feb. 3, 2026

(54) MONITORING A HEALTH STATUS OF A SOLENOID

(71) Applicant: ATLAS COPCO AIRPOWER, NAAMLOZE VENNOOTSCHAP, Wilrijk (BE)

(72) Inventor: Hans Vande Sande, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 42 days.

(21) Appl. No.: 18/564,292

(22) PCT Filed: Jun. 3, 2022

(86) PCT No.: PCT/EP2022/065243
§ 371 (c)(1),
(2) Date: Nov. 27, 2023

(87) PCT Pub. No.: WO2022/263211
PCT Pub. Date: Dec. 22, 2022

(65) Prior Publication Data
US 2024/0255069 A1    Aug. 1, 2024

(30) Foreign Application Priority Data
Jun. 14, 2021   (BE) .................................. 2021/5464

(51) Int. Cl.
*F16K 37/00*   (2006.01)
*H01F 7/18*   (2006.01)

(52) U.S. Cl.
CPC ....... *F16K 37/0041* (2013.01); *H01F 7/1844* (2013.01)

(58) Field of Classification Search
None
See application file for complete search history.

(56) References Cited

U.S. PATENT DOCUMENTS 6,262,874 B1*  7/2001  Stoll ..................... H01F 7/1844
                                                            361/160
6,721,158 B2*  4/2004  Heinke ................ H01H 47/325
                                                            361/155
(Continued)

FOREIGN PATENT DOCUMENTS

DE    102017200809    6/2018
EP        3676860    7/2020
(Continued)

OTHER PUBLICATIONS

Belgium Search Report issued in BE202105464, dated Mar. 2, 2022, 8 pages.
(Continued)

*Primary Examiner* — Matthew W Jellett
(74) *Attorney, Agent, or Firm* — HSML P.C.

(57) ABSTRACT

A computer-implemented method for estimating a health state of a solenoid valve including a solenoid for supporting a process control system. The method includes the steps of monitoring a current passing through the solenoid, determining a time period between an instant of initiating a state change of the solenoid valve and an instant when the time derivative of the current is discontinue, comparing the time period with a reference time period indicative for the health state of the solenoid valve thereby determining the health state.

14 Claims, 3 Drawing Sheets

(56) References Cited

U.S. PATENT DOCUMENTS 11,499,651 B2 * 11/2022 Lampe-Juergens ......................... F16K 37/0083
2020/0217894 A1 7/2020 Ferrarini et al.

FOREIGN PATENT DOCUMENTS

| JP | 2002-174358 | 6/2002 |
| WO | 2019043572 | 3/2019 |
| WO | 2021/229895 | 11/2021 |

OTHER PUBLICATIONS

International Search Report and Written Opinion issued in PCT/EP2022/065243 dated Aug. 26, 2022, 8 pages.
The International Preliminary Report on Patentabilityi ssued in PCT/EP2022/065243, dated Apr. 3, 2023, 11 pages.
Japanese Office Action issued in JP Application No. 2023-573416, mailed Sep. 26, 2024, 8 pages, English machine translation.
Indian Examination Report issued in Indian Application No. 202337073884, dated Nov. 6, 2025, 6 pages, English translation.

* cited by examiner

MONITORING A HEALTH STATUS OF A SOLENOID

TECHNICAL FIELD

The present invention relates to the field of solenoid valves and in particular to a method of monitoring the health status thereof.

BACKGROUND

A solenoid valve is an electromechanically operated valve and is one of the most commonly used components in industrial applications to control fluid flow. Characteristics of solenoid valves differ in characteristics of the electric current they use, the strength of magnetic field generated, the mechanism they use to regulate a fluid, and the type and characteristics of fluid they control. In other words, there are many valve designs, yet they all have one common component, namely the solenoid.

Essentially, the solenoid is an electro-mechanical actuator. It comprises a static part, the coil, and a moving part, the plunger. The interface between both parts is principally accomplished by a mechanical spring.

The coil may be powered by a voltage source thereby realizing a linear movement of the plunger. The stroke length or the distance between the plunger's begin and end position, is generally small in the order of magnitude of 1 mm.

Controlling fluid flows in industrial applications means that solenoid valves tasks are to shut off, release, dose, distribute, or mix fluids. It is however important that they offer these tasks in a safe and reliable manner.

Because of its technical function, it will be unavoidable that the solenoid valve will degrade over time. Besides the quality of the solenoid valve itself, a variety of other variables will influence its lifespan like the intensity of use and/or the atmospheric conditions wherein it operates. Other influences are clogging due to fluid particles of the controlled process and working conditions such as applied pressure.

To avoid any critical situation and to guarantee a proper operation of the industrial installation wherein solenoid valves are operating, it is therefore important that a malfunctioning solenoid valve is replaced as quickly as possible. Moreover, it should be avoided that a solenoid valve malfunctions, in other words, a solenoid valve should be replaced before any malfunction occurs.

A method to avoid any critical situation is defining a maintenance interval wherein all solenoid valves of an industrial installation are replaced. The interval will, for example, be determined based on a total number of allowable switching operations or just be a time period expressed in working hours of the industrial installations itself.

A disadvantage in defining the maintenance interval based on the number of allowable switches is that it has to be chosen in a very conservative manner, especially when a safe and reliable operation needs to be guaranteed. In other words, the occurrence that only one solenoid valve fails, needs to be avoided. This may result in a replacement of a whole set of solenoid valves which are still well-functioning and potentially remain well-functions for very long times and/or many more switching operations.

There is thus a need for an improved method for monitoring a condition or a health status of a solenoid valve.

SUMMARY OF THE INVENTION

The present invention aims to remedy the above-mentioned and other disadvantages. To this end, the present invention according to a first aspect concerns a computer-implemented method for determining a health state of a solenoid valve comprising a solenoid, the solenoid valve suitable for supporting a process control system, the method comprising the steps of:
  monitoring a current passing through the solenoid;
  determining a time period between an instant of initiating a state change of the solenoid valve and an instant when the time derivative of the current is discontinue;
  comparing the time period with a reference time period indicative for the health state of the solenoid valve thereby determining the health state.

The solenoid comprises a coil, a plunger, and a mechanical spring. As already mentioned, the coil may be powered by a voltage source thereby realizing a linear movement of the plunger. When the coil is powered, a current flow therein causing the movement of the plunger. This movement causes a state change of the solenoid valve, either into an open or closed state. The latter depends on the type of solenoid valve, namely either a normally open or normally closed solenoid valve. It is thus the current that causes or initiates a state change that is monitored.

Next, while monitoring the current a time period indicative for the health state of the solenoid valve is determined. This time period is the time between the instant a state change is initiated and the instant that the time derivative of the monitored current is discontinue.

It should be further understood that the instant the current becomes discontinue can be determined accurately when the current is monitored as a continuous-time signal. This would correspond to sampling at an infinite sampling frequency or with an infinitesimal small sampling period. In practice, said instant will thus be determined indirectly because of the used practical sampling frequency and corresponding sampling period. The indirect determination will further be discussed in this disclosure of the invention.

When a state change is initiated, a voltage over the connection points of the coils is applied and an electric current starts to flow in it. The value of the current will not instantly be at a particular level but will be build up from zero because the coil is an inductive component. While building up, the current is monitored, and the time derivative is calculated, either directly or indirectly. Since the current is building up, i.e. changing over time, the time derivative is therefore also varying over time. Furthermore, the magnetic field caused by the current creates a force which moves the plunger until the solenoid valve is either open or closed. Additionally, the mechanical spring will influence the movement of the plunger as well. Hence, the current in the plunger is initially influenced by the applied voltage source, but further also by a set of other variables, like the movement of the plunger.

In other words, the magnetic field generated by the coil which initially moves the plunger, is itself also influenced by the position and the movement of the plunger as a result of Maxwell's equations. This means that the movements of the plunger impact the current flowing through the coil and vice versa. It should thus be clear that the value of the current over time varies, as well as its time derivative.

Thus, while monitoring, the time period between an instant when a state change of the solenoid valve is initiated and an instant when the time-derivative of the current is discontinue is determined.

The instant when a state change is initiated is, for example, the instant when an instruction is given to change the state or the instant when the current in the coil differs from zero. This instant may thus be determined as an instant when the magnitude of the current surpasses a predefined threshold. Alternatively, the state change may be determined when a command thereto is given. Additionally, the monitoring may be initiated by said command. Furthermore, note that when dealing with alternating current valves, the magnitude may be regarded as being an absolute value thereof for dealing with the occurrence when the current initiates at a negative half-period.

Nevertheless, it should be understood that this instant should be chosen in a coherent and consistent manner such that a set of determined time periods can be compared with each other.

The other instant defining the end of the determined time period is when the time derivative is discontinue. This is thus the instant when the curve of the current has a kink or dip.

When monitoring the current at a high sampling frequency, said kink may be determined accurately, thus in a more or less direct manner. More in practice, this kink may be determined indirectly by processing the samples representing the current. A range of samples of which the values are descending, followed by a range of samples of which the values are increasing, indicates that in between said ranges the kink may be present.

The computer-implemented method may therefore comprise the step of sampling the current thereby obtaining an array of sampled currents. The determining of the instant and comparing it with a reference time period may then be performed by said array of sampled currents.

Next, the determined time period is compared with a reference time period. Alternatively, the array of sampled currents is correlated with a reference array of the solenoid valve to determine said time period.

Another approach to determine the time period is sequentially correlating a subarray of the array of sampled currents with a reference subarray representing a V-shaped or an L-shaped function.

The reference time period is indicative for the health state of the solenoid valve. Thus, for a particular type and model of a solenoid valve, a time period may be defined as the reference time period. The reference time period is, for example, determined when the solenoid valve is taken into service for the first time. During operation of the solenoid valve, the time period is regularly or even continuously compared with the reference time period. When the determined time period starts to drift or increase over time, this is an indication that the solenoid valve's functioning is degrading. In other words, the health status of the solenoid valve deteriorates.

The reference time period and the determined time period may further depend on parameters such as the operational pressure. Depending on the valve type, when the operational pressure increases, the reference time period can increase, decrease or stay constant. Consequently, the drift or increase of the determined time period may depend as well on parameters such as the operational pressure.

To cope with the dependence of the determined time period or the health status on the operational pressure, one could divide the operational pressure range in a limited number of classes and compare the determined time period or health status within measurements of the same class only.

Alternatively, one could model the relation between the reference time period and the operational pressure by a polynomial, or another suitable type of fitted curve, thereby generating a ground truth. During the operational life of the solenoid, this polynomial model or other curve fitted model could be updated upon every switching instant a new determined time period becomes available. The difference between the updated polynomial model or curve fitted model and the ground truth becomes larger and larger over time and establishes a measure for the deterioration of the solenoid valve as well.

Finally, the determined time period may be reported. Alternatively, and preferably, instead of reporting the time period, the health state of the solenoid valve may be reported. Furthermore, the data representative for the instant and/or the health state may be send to another device for further processing.

The health state may, for example, be a value between zero and one, whereby zero corresponds to a failed solenoid valve, and one corresponds to a new and healthy solenoid valve. Alternatively, the health state may be reported as 'healthy', 'degrading', or 'faulty'.

Different advantages may be identified. Firstly, each solenoid valve may be monitored individually. Furthermore, this may be done in a structured and automated manner. Secondly, the determining of the health state may be performed independently of the environment wherein the solenoid valves operate. In other words, this environment is indirectly considered since a quicker deterioration due to a harmful environment will be noticed by merely determining the time period as discussed above.

According to a second aspect of the invention, a data processing apparatus comprising a processor adapted to perform the steps of the method according to the first aspect is disclosed. The processor may be a microprocessor or a microcontroller.

According to a third aspect of the invention, a computer program comprising instructions which, when the program is executed by a computer, cause the computer to carry out the method of the first aspect is disclosed.

According to a fourth aspect, a data carrier signal carrying the computer program of the third aspect is disclosed.

According to a fifth aspect, a node comprising the data processing unit apparatus according to the second aspect is disclosed together with an interface configured to represent the health state.

According to a sixth aspect, a solenoid valve comprising the apparatus according to the second aspect, and/or the node according to fifth aspect is disclosed.

BRIEF DESCRIPTION OF THE DRAWINGS

The invention will further be illustrated with references to the drawings, wherein.

DETAILED DESCRIPTION OF EMBODIMENT(S)

Figure 1:
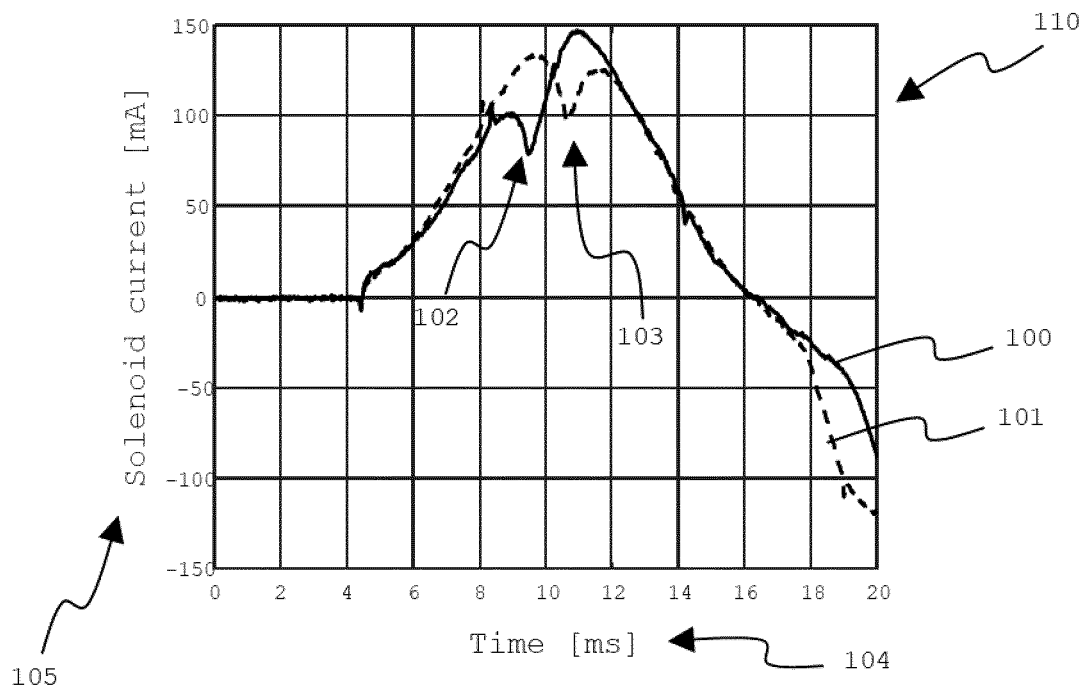
FIG. 1 illustrates currents as a function of time of an alternating current solenoid.

FIG. 1 illustrates currents as a function of time of an alternating current solenoid. On the graph 110, the time is represented on the abscissa 104 and the values of the current on the ordinate 105. The solid line 100 represents a well-functioning solenoid, this means in a healthy condition, while the dashed line 101 represents the current of the same solenoid which is after a number of switching operations malfunctioning and needs to be replaced.

Figure 5:
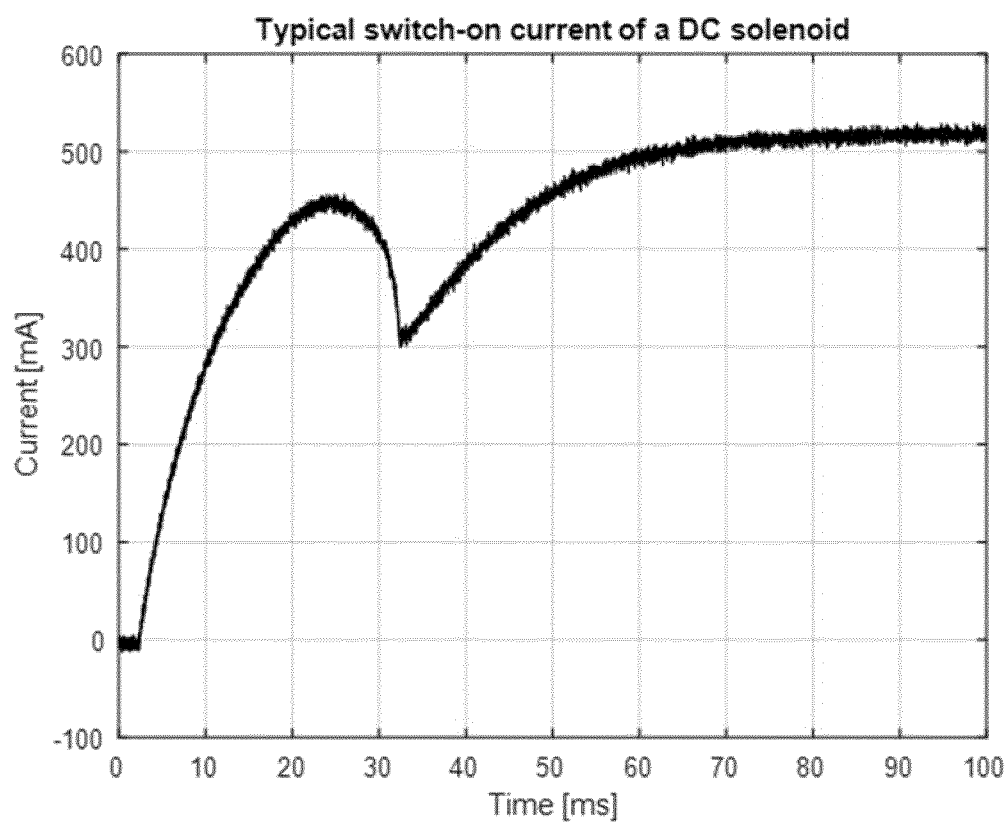
FIG. 5 illustrates a typical switch-on current of a direct current solenoid.

As already discussed in the summary of the invention, the plunger impacts the current flowing through the coil as represented by the graphs 110. Both currents as represented by 100 and 101 show a typical coil current on the ordinate 105 as a function of time on the abscissa 104 when being switched on to an alternating voltage source. The dip 102 in the pattern of current 100, in this example around 9.5 ms, or 5.2 ms after the switching operation which occurs on 4.3 ms, is characterized by a sudden change of the current's time derivative. This dip 102 occurs at the moment the plunger hits its mechanical end position. In what happens afterwards, the solenoid can be considered as a component without a moving part, whereby the current 100 converges to a periodical pattern. Solenoid valves supplied by a constant voltage source reveal a similar current dip 102, yet their current eventually converges to a constant value. This is further illustrated in FIG. 5 which illustrates a typical switch-on current of a direct current solenoid. Herein, the dip occurs at approximately 32 ms, and the current converges to the constant value of approximately 500 mA.

It should be further be understood that the claimed invention is independent of the type of solenoid, i.e. being an alternating current solenoid or direct current solenoid. For both types, the same method is, mutatis mutandis, applied for determining the health status thereof.

The current may be measured with the use of a Hall-sensor and/or a shunt. Next, the measured voltage, which is proportional to the current, may be transformed by an analogue-digital-converter for further processing.

The disclosed method monitors this dip 102, meaning that the instant this dip 102 occurs with regard to the instant of the initiating of the state change at 4.3 ms is determined. In this example the time period between the instant of initiating a state change of the solenoid valve and the instant when the time derivative of the current is discontinue, thus when the dip 102 occurs, is 5.2 ms.

Figure 2:
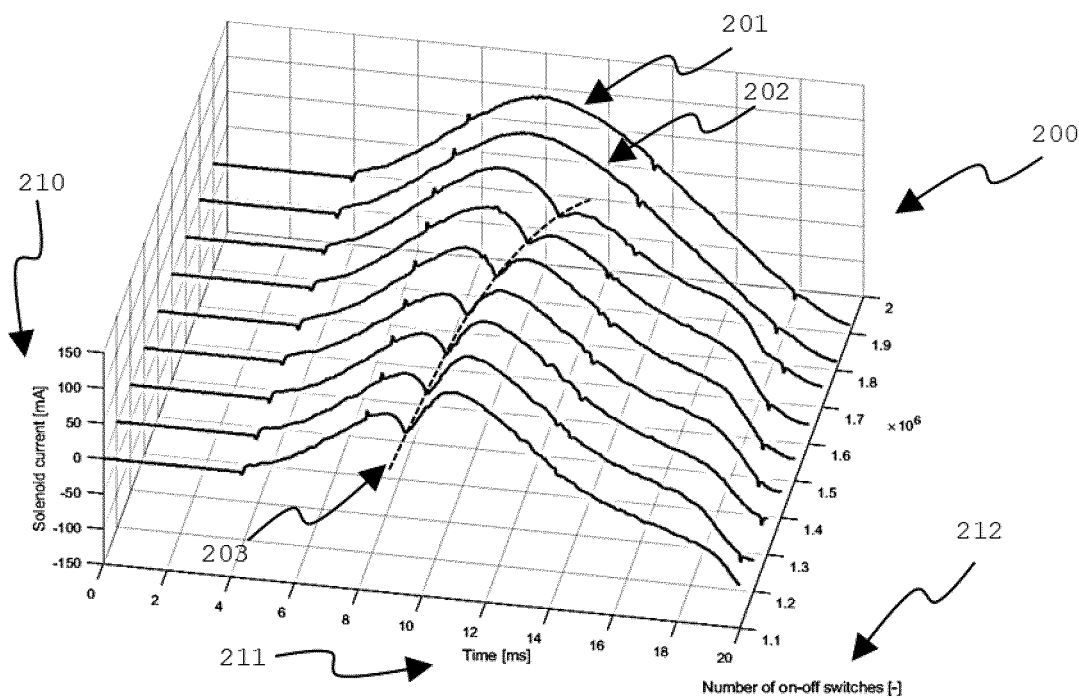
FIG. 2 illustrates an evolution of the current as a function of time of an alternating current solenoid.

The dip in the current will shift to the right on the graph 110 the more the valve has been switched, as illustrated by the dashed line 101 in FIG. 1. In FIG. 2 the evolution of the shifting of these dips is illustrated in more detail. In these graphs 200 again the time is represented on the abscissa 211 and the values of the current on the ordinate 210, and further extended by a z-axis representing the number of switches 212.

In the illustration of FIG. 2 it can be observed that the place of the dips 102 to 103 shifts away, indicated by dashed line 203. This shift corresponds to an increase of the time period between the instant of initiating a state change of the solenoid valve and the instant when the time derivative of the current is discontinue. In the last graphs 201 and 202 the dips even disappear which means that said time period becomes infinite or unidentified. This corresponds to a failed solenoid.

There are several phenomena causing this shift 203. While hitting the end positions over and over again, wear may cause debris particles to abrade from the plunger surface, increasing the mechanical friction on the one hand and reducing the plunger length on the other hand. Furthermore, particles present in the fluid which the solenoid valve controls may hinder the functioning of the solenoid valve and eventually blocking it.

Particularly for alternating current valves, the shift 203 is amplified when the shadowing coil, responsible for keeping the plunger in its end position while the coil currents cross zero, deteriorates and/or breaks, as this results in a huge amount of repetition hits at twice the grid frequency.

Figure 3:
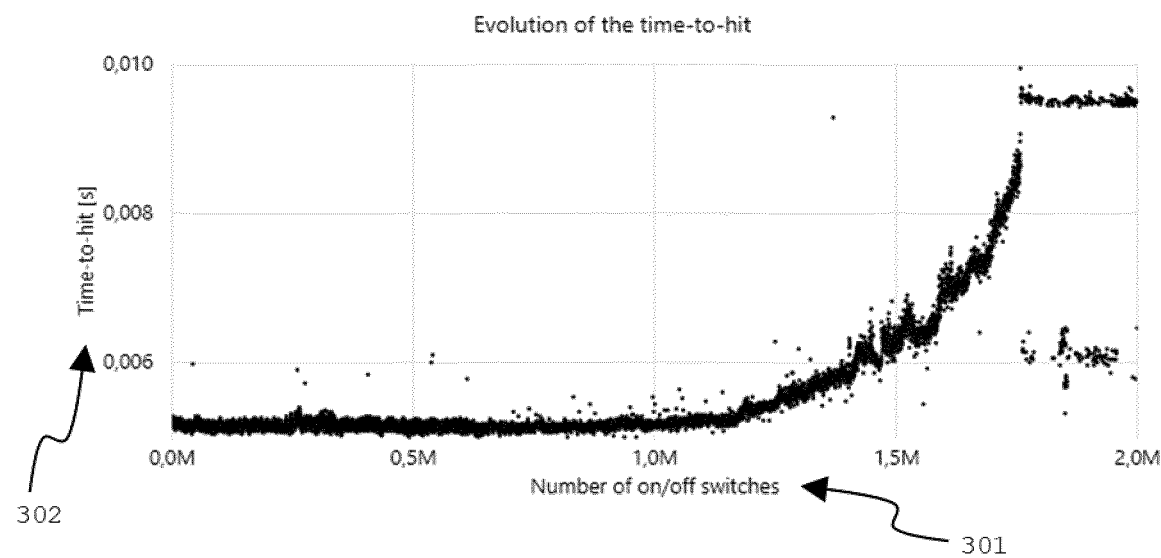
FIG. 3 illustrates steps performed according to an embodiment of the invention.

When only considering the time interval between the instant of switching on and that of the current dip, defined further as the time-to-hit, an even more detailed figure of this evolution can be plotted as illustrated in FIG. 3. The number of switches in illustrated on the abscissa 301 and the time-to-hit on the ordinate 302.

Three phases in the illustration of FIG. 3 can be distinguished.

In the initial phase, the dip remains approximately at a same position and the solenoid performs as specified by the supplier. The time-to-hit shows a statistical distribution with a typical mean value and a very small deviation.

In the degradation phase, the dip starts shifting to the right the more on-off cycles have been done. Since the plunger eventually hits the end position, the plunger is definitely not blocked, and the valve might still function properly for the intended application. However, one should be aware of other potentially harmful second-order effects. For example, if the shadowing coil of an alternating current breaks—often coinciding with the start of the degradation phase—the plunger may shortly leave and return to the end position twice per cycle of the grid voltage, causing repetition hits, accelerated wear, tiny leakages and/or irritating noise.

In the end-of-life phase, dips are no longer distinguished, indicating blockage of the plunger. As blockage may happen in the start position, end position, or somewhere in between, there is absolutely no guarantee about the effect of the failure on the intended application.

Consequently, according to the disclosed method of this invention, the time-to-hit is used as a health indicator for the solenoid.

As long as the distribution of the time-to-hit does not statistically deviate with some level of probability from its original distribution, the solenoid is considered healthy. The moment this condition is no longer met, the degradation phase is initiated. In some applications, this may be the right moment to replace the solenoid.

If the application allows solenoids running in the degradation phase, one can make use of the time-to-hit value to estimate the remaining useful life up to some statistical level of probability. To do so, one requires evolution curves of the time-to-hit for a multitude of identical valves, preferably in different applications, and make a statistical model of that evolution. There are various ways to statistically approach this.

The availability of the time-to-hit allows evolving from preventive maintenance, i.e. blindly replace solenoids at fixed intervals or after fixed number of on-off switches, via condition-based maintenance, i.e. inferring initiation moment of degradation phase, towards predictive maintenance, i.e. inferring remaining useful life. This has several advantages as solenoids only need to be replaced when effectively required. Over time and on an average base, this reduces the cost of solenoids, the cost to service machines in which solenoids are to be replaced, as well as the cost linked with non-productivity of the system in which solenoids are being replaced. Moreover, in the predictive maintenance case, solenoid replacement can even be scheduled to minimize the impact on productivity.

The movement of the solenoid plunger typically ends within a 10 ms time interval when dealing with alternating current valves. As for direct current valves, the time interval may be around 30 ms in a healthy state and going up to 50 ms in a deteriorated state. To obtain sufficient accuracy for the time-to-hit computation, e.g. 0.1 ms, a minimal sampling frequency of 10 kHz is advised. Sampling at 4 kHz is likewise possible when a time resolution of 0.25 ms is acceptable. It should be noted that this is a trade-off between accuracy and cost of sampling.

The current is to be sampled continuously. When unpowered, the current is theoretically zero, but its digital representation typically varies close to the lowest significant bits. Therefore, one needs to define a threshold value that is never exceeded when the solenoid is unpowered, yet that is as small as possible, e.g. 5 mA. Hence, upon excess of the chosen current threshold, the solenoid is for sure operating with a moving plunger in its early transient phase. This triggers the storage of all subsequent current samples in a buffer that covers a time span of at least 10 ms, e.g. 100 samples at 10 kHz sampling frequency, but preferably 100 ms such that also direct current valves may be monitored. When the buffer is filled, a numeric algorithm starts computing a series of correlation coefficients with a much shorter reference vector in which a V-shaped profile or L-shaped profile is typically stored. The goal is to define the position in the buffer for which this correlation coefficient is largest, as this is a measure for the time-to-hit. The bias equals the time between switching on and exceeding the threshold value and could be added to retrieve an exact value for the time-to-hit.

Figure 4:
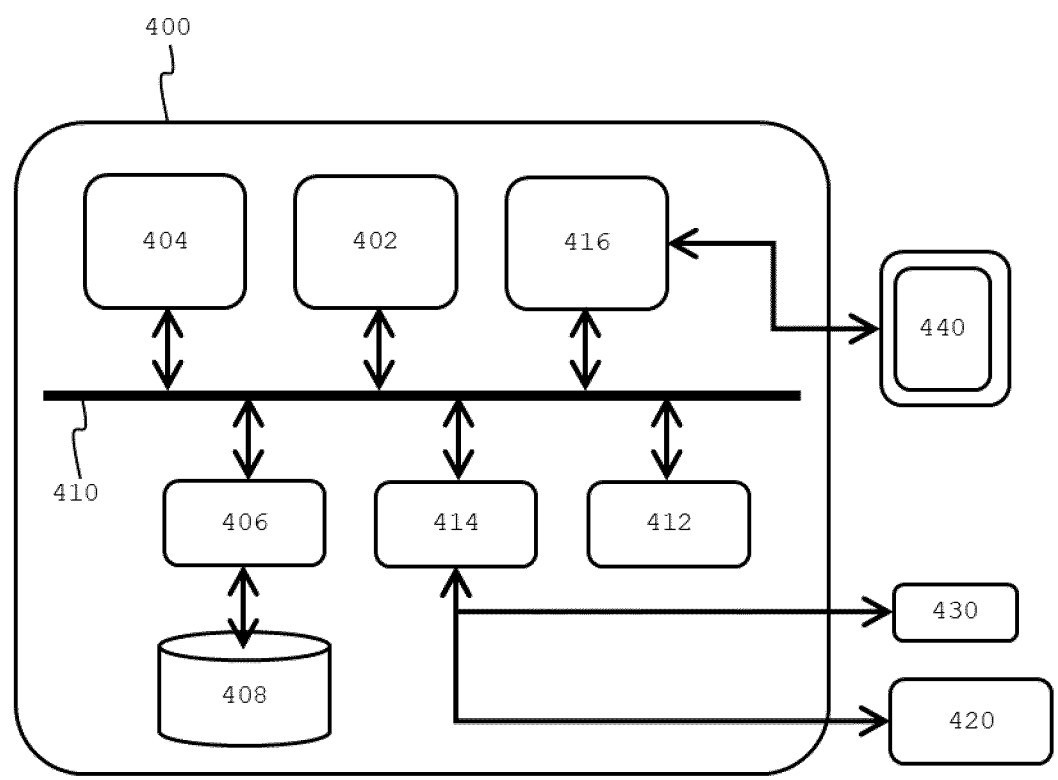
FIG. 4 illustrates a suitable computing system for performing steps according to various embodiments of the invention.

FIG. 4 shows a suitable computing system 400 for performing the steps according to the above embodiments. Computing system 400 may be used as an application comprising a data processing apparatus comprising a processor adapted to perform the steps of the method for estimating the health stated of a solenoid valve.

Computing system 400 may in general be formed as a suitable general-purpose computer and comprise a bus 410, a processor 402, a local memory 404, one or more optional input interfaces 414, one or more optional output interfaces 416, a communication interface 412, a storage element interface 406 and one or more storage elements 408. Bus 410 may comprise one or more conductors that permit communication among the components of the computing system 400. Processor 402 may include any type of conventional processor or microprocessor that interprets and executes programming instructions. Local memory 404 may include a random-access memory (RAM) or another type of dynamic storage device that stores information and instructions for execution by processor 402 and/or a read only memory (ROM) or another type of static storage device that stores static information and instructions for use by processor 402. Input interface 414 may comprise one or more conventional mechanisms that permit operator to input information to the computing device 400, such as a keyboard 420, a mouse 430, a pen, voice recognition and/or biometric mechanisms, etc. Output interface 416 may comprise one or more conventional mechanisms that output information to the operator, such as a display 440, etc. Communication interface 412 may comprise any transceiver-like mechanism such as for example one or more Ethernet interfaces that enables computing system 400 to communicate with other devices and/or systems to acquire the parameters at regular intervals. The communication interface 412 of computing system 400 may be connected to such another computing system by means of a local area network (LAN) or a wide area network (WAN) such as for example the internet. Storage element interface 406 may comprise a storage interface such as for example a Serial Advanced Technology Attachment (SATA) interface or a Small Computer System Interface (SCSI) for connecting bus 410 to one or more storage elements 408, such as one or more local disks, for example SATA disk drives, and control the reading and writing of data to and/or from these storage elements 408. Although the storage elements 408 above is described as a local disk, in general any other suitable computer-readable media such as a removable magnetic disk, optical storage media such as a CD or DVD, -ROM disk, solid state drives, flash memory cards, . . . could be used. The system 400 described above can also run as above the physical hardware.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one (s) described or illustrated above.

The invention claimed is:

1. A computer-implemented method for estimating a health state of a solenoid valve comprising a solenoid for supporting a process control system, the method comprising the steps of:
    monitoring a current passing through the solenoid;
    determining a time period between an instant of initiating a state change of the solenoid valve and an instant when the time derivative of the current is discontinued;
    comparing the time period with a reference time period indicative for the health state of the solenoid valve thereby determining the health state; wherein,
    the method further comprising the step of:
    sampling the monitored current by obtaining an array of sampled currents, and wherein the determining and the comparing steps are performed on the array of sampled currents, and the determining step is further performed by sequentially correlating a subarray of the array of sampled currents with a reference subarray representing a V-shaped or L-shaped function.

2. The computer-implemented method according to claim 1, wherein the state change is determined as an instant when the magnitude of the current surpasses a predefined threshold.

3. The computer-implemented method according to claim 1, wherein the state change is determined when a command thereto is given.

4. The computer-implemented method according to claim 3, wherein the monitoring is initiated by the command.

5. The computer-implemented method according to claim 1, further comprising the step of:
  reporting data representative for the instant and/or the health state.

6. The computer-implemented method according to claim 1, further comprising the step of:
  sending data representative for the instant and/or the health state.

7. A data processing apparatus comprising a processor adapted to perform the steps of the method of claim 1.

8. The apparatus according to claim 7, wherein the processor is a microprocessor or a microcontroller.

9. A non-transitory computer program comprising instructions which, when the program is executed by a computer, causes the computer to carry out the method of claim 1.

10. A node comprising the data processing unit apparatus according to claim 7, and an interface configured to represent a health state.

11. A solenoid valve comprising the apparatus according to claim 7.

12. A solenoid valve comprising the node according to claim 10.

13. A compressor comprising the data processing apparatus according to claim 7.

14. The computer-implemented method according to claim 1, further comprising the step of:
  when the comparing step indicates that the time period between the instant of initiating the state change of the solenoid valve and the instant when the time derivative of the current is discontinued is infinite or unidentified, replacing the solenoid.

* * * * *